United States Patent Office 3,124,505
Patented Mar. 10, 1964

3,124,505
AEROSOL CONCENTRATES CONTAINING A STABILIZED SUSPENSION OF FINELY DIVIDED SILICA
Carroll F. Doyle, Ellicott City, and Luther O. Young and Joseph Albert Chatard, Jr., Baltimore, Md., assignors to W. R. Grace & Co., New York, N.Y., a corporation of Connecticut
No Drawing. Filed Aug. 15, 1961, Ser. No. 131,485
27 Claims. (Cl. 167—39)

This invention relates to insecticidal compositions suitable for use in preparing sprayable compositions, to the sprayable compositions so produced, and to aerosol bombs containing the said sprayable compositions. More specifically, this invention relates to insecticidal compositions comprising insecticidal silica which are suitable for the uses described.

It has been discovered in recent years that fine particle size silica, having an average particle size of from about 1 to about 10 microns, preferably less than about 5 microns with a typical particle size distribution ranging from about 2 to about 6 microns is excellently adapted for use as an insecticidal agent. Fine particle size silica is not toxic to animals unless its dust is persistently breathed over a long period of time. Such silica can also be removed from plants and shrubs by simple washing and will leave no toxic residue. Fine particle size silica has been found to be extremely lethal to many inserts such as roaches, fleas, termites, various mites, mosquitoes and the like. Specific results of some tests made in this regard are found in the literature, e.g., Tarshis, UCLA Tests With Desiccant Dusts for Roach Control; Pest Control, vol. 27, No. 6 at pp. 14 et seq. (1959); Tarshis, Use of Sorptive Dusts on Fleas; California Agriculture, col. 13, No. 3, pp. 13, 14 (1959); and Ebeling et al., Rapid Desiccation of Drywood Termites With Inert Sorptive Dusts; Journal of Economic Entymology, vol. 52, No. 2, pp. 190–207 (1959).

Despite this highly attractive use for fine particle size silicas, it has not been possible to make economical aerosol bombs containing this material. In preparing such aerosol bombs, the silica is first mixed with a suitable suspending medium to prepare an aerosol concentrate, the concentrate is then blended with about one-half to about one and one-half parts by weight of propellant per part of concentrate and the aerosol composition is placed into a pressure container having a hand operated dispensing valve. Since the propellant thus dilutes the silica concentration in the final aerosol composition it is obvious that in order to obtain a satisfactory product, the amount of silica in the aerosol concentrate should be as high as possible.

It has been observed, however, that when any economically feasible concentration of finely divided silica is mixed with the suspending media used in preparing the aerosol concentrate, the dispersions exhibit a great variety of colloidal phenomena, among which are high false body viscosity, thixotropic behavior, storage instability, phase separation and the formation of non-dispersible precipitates. Thus, it has been found that the incorporation of finely divided silica in conventional suspending media in amounts greater than about 12 percent by weight produces aerosol concentrates which cannot be used in preparing aerosol compositions. At silica concentrations below about 12 percent by weight in the concentrate, the concentration in the aerosol composition is reduced to a maximum of about 5 or 6 percent which is undesirably low and highly uneconomical.

It is an object of this invention to avoid the problems enumerated above. It is another object of this invention to provide aerosol concentrates which contain up to about 20 percent by weight of finely divided silica and which nevertheless can be used to prepare aerosol compositions and moreover possess long time storage stability. It is another object of this invention to provide aerosol compositions having a much higher concentration of finely divided silica than previously possible which at the same time remain sprayable for months, thus permitting intermittent use of the aerosol bomb without clogging the valve or the nozzle. Other objects of the invention will be obvious to those skilled in the art in view of the following description.

It has been found that a particular choice of suspending media together with a suspension stabilizer in certain critical proportions permits the incorporation of a much higher proportion of silica, in the range of from about 10 to 20 percent by weight, in the aerosol concentrate without detracting from the usefulness of the said concentrate in an aerosol composition.

The suspending media which have been found suitable for the purposes of this invention are (a) 1,1,1-trichloroethane and (b) narrow boiling range petroleum hydrocarbon fractions having boiling ranges between the temperatures of about 140° centigrade and about 400° centigrade. The petroleum hydrocarbons, commonly known as solvent naphtha, are available from many sources of supply. Typical examples of suitable petroleum hydrocarbons have the following properties:

| | Shell Sol 36 | Solvasol No. 2 |
|---|---|---|
| Specific Gravity, 60/60, ° F | 0.789 | 0.714 |
| Flashpoint, ° F., ASTM D–56 | 103 | –19 |
| Kauri Butanol No. ASTM D–1133 | 39.5 | 40 |
| Aniline Point, ° F., ASTM D–611 | 123 | 118 |
| Distillation, ° F., ASTM D–86: | | |
| IBP | 314 | 150 |
| 10% distilled | 322 | 154 |
| 50% distilled | 327 | 160 |
| 90% distilled | 338 | 172 |
| End Point | 360 | 191 |

Mixtures of the two suspending media may be used if desired. Since it is preferable that the aerosol composition have a low flame projection when tested in accordance with the Interstate Commerce Commission's Regulations of Tariff No. 10, it is preferred to use only minor proportions of the petroleum hydrocarbons, on the order of 50% by weight or less of the total suspension medium in the aerosol concentrate. A particularly preferred suspension medium is one in which the weight ratio of 1,1,1-trichloroethane to solvent naphtha is in the range of from about 3 to 1 to about 10 to 1. However, it is to be stressed that although low flame projection is a desideratum it is not an absolute requirement, and therefore use of petroleum hydrocarbons as the sole suspending agent is not beyond the scope of this invention.

The suspension stabilizer used in this invention is a low molecular weight organic alcohol or ketone. The alcohol or ketone should have no more than about 10 carbon atoms and preferably has from 2 to 6 carbon atoms. Specific suspension stabilizers which can be used include methnol, ethanol, propanol, isopropanol, butanol, isobutanol, sec-butanol, pentanols, hexanols, 2-ethyl hexanol, 2-octanol, acetone, methyl ethyl ketone, diethyl ketone, diisopropyl ketone, ethyl isopropyl ketone and the like. Mixtures of two or more stabilizing agents may be used if desired. As with the petroleum hyrdocarbon suspension medium, certain of the stabilizing agents will cause larger flame projections than others. However, as stated above, a low flame projection is not absolutely required and thus any of the stabilizing agents in the class defined above is to be deemed within the scope of this invention. The preferred stabilizing agent, from the standpoint of economy, efficiency, low toxicity, low odor and low flame propagation is isopropanol.

The amounts of suspension stabilizer used in the invention are within the range of from about .25 part to about 1.5 parts by weight of agent per part by weight of finely divided silica. The minimum amount of stabilizing agent that can be used is that amount which gives a useful effect, while the maximum amount is that which causes the finey divided silica to settle into a hard difficultly redispersible mass. From the data presented in the examples below, the optimum amount of any particular stabilizer will be obvious to one skilled in the art. The amount of preferred stabilizing agent, isopropanol, has been found to be between about 0.4 and about 1.2 parts per part by weight of silica.

The method of preparing the aerosol concentrate of this invention is fully explained in the examples given hereinafter. Preparation of an aerosol composition therefrom by adding a propellant to the concentrate is also shown in the examples. Any suitable propellant may be used, although it is preferred to use the relatively non-toxic halofluorohydrocarbons commonly known as Freons. The most particularly preferred propellants in this invention are dichlorodifluoromethane and trichloromonofluoromethane. The amount of propellant used is between about 0.5 and about 1.5 parts by weight per part of aerosol concentrate. This is sufficient to provide an initial spraying pressure of from about 20 to 25 pounds per square inch gauge at 70° Fahrenheit and to substantially empty the aerosol container when the period of ordinary use is completed.

In preparing the aerosol compositions, it is preferred to use a so-called "knockdown" agent in conjunction with the insecticidal finely-divided silica. A knockdown agent found to be most effective in the compositions of this invention was a synergistic mixture of piperonyl butoxide and a pyrethrum extract known to the art as pyrethrins (see Metcalf et al., Destructive and Useful Insects, third edition (1951), pp. 277–281). The pyrethrum extract used was obtained from a commercial source of supply as a 20% by weight concentrate of pyrethrins in petroleum hydrocarbons. As is shown in the examples below, use of a knockdown agent greatly enhances the effectiveness of the aerosol compositions of this invention. The knockdown agent is incorporated in the aerosol by mixing it into the aerosol concentrate prior to combining the concentrate with the propellant. The knockdown agent is added in amounts to provide from about 0.05 to about 0.25 percent by weight of pyrethrins and from about 0.1 to about 1.0 percent by weight of piperonyl butoxide in the final aerosol composition.

The invention is further illustrated by the non-limiting specific examples which follow. In each of the examples the finely divided silica used was the Dri-Die 67 described in the Tarshis article cited previously herein. This silica has an average particle size of about 3 microns, with a particle size range of from about 2 to 6 microns, and contains about 1 to about 4 percent by weight of fluorine. Finely divided silicas of the size previously stated with or without any fluorine additive can be effectively incorporated into aerosol concentrates and aerosol compositions in the same manner as specific silica used in the examples.

EXAMPLE I 30 grams of isopropyl alcohol was thoroughly mixed with 370 grams of 1,1,1-trichloroethane and 387 grams of this mixture added to 63 grams of fine particle size silica. The mixture was hand-stirred until all of the silica was thoroughly wetted by the solvent and then was thoroughly blended by rapid agitation for five minutes. The freshly prepared suspension was sufficiently fluid to permit easy spraying. It was aged one month. At the end of this period the suspension was found to be thixotropic but became fluid when mildly shaken and was satisfactory for use in preparing an aerosol composition.

The characteristics of the aerosol concentrate produced by Example I should be contrasted with those of the following formulation in which no alcohol was used.

EXAMPLE I-A 7 grams of fine particle size silica was added to 93 grams of 1,1,1-trichloroethane. The mixture was hand-stirred until all of the silica was thoroughly wetted by the trichloroethane and then was thoroughly blended by rapidly agitating the mixture for five minutes. Immediately after agitation, the viscosity of the suspension was low enough to permit spraying. Shortly thereafter, a thixotropic change occurred. After standing 24 hours, the suspension was very thick. The dispersion could be thinned by shaking but thickened rapidly on standing. After storage for six months, it was found to have the same thixotropic properties as had been observed after the 24 hour aging period. It was not a satisfactory aerosol concentrate.

EXAMPLE II 58.1 grams of isopropyl alcohol was mixed with 441.9 grams of solvent naphtha. 430 grams of this mixture was added to 70 grams of fine particle size silica and thoroughly blended by five minutes of violent agitation. The suspension was aged for six months. The suspension was stable, somewhat thixotropic, but returned to a fluid state with mild agitation. It thickened very slowly after shaking, and was quite suitable as an aerosol concentrate.

The effectiveness of the concentrate of Example II should be contrasted with the characteristics of the following solvent naphtha suspension.

EXAMPLE II-A 90 grams of solvent naphtha was added to 10 grams of fine particle size silica. The mixture was hand-stirred until all of the silica was wetted by the naphtha and then blended thoroughly by violent agitation for five minutes. The suspension was aged for six months. At the end of this period it was found to be a thixotropic gel which thinned when shaken but thickened almost instantly upon standing. It was not suitable for use in preparing an aerosol composition.

EXAMPLE III 57 grams of isopropyl alcohol, 171.5 grams of 1,1,1-trichloroethane and 171.5 grams of solvent naphtha were mixed together. The mixed solvents were added to 75 grams of fine particle size silica, hand-stirred until the silica was completely wetted and then violently agitated for five minutes. The suspension was thixotropic but stable. At the end of four months this condition remained. The thixotropic suspension thinned easily when disturbed and thickened slowly when allowed to stand. It was a good aerosol concentrate.

Without alcohol, the silica in a naphtha-chlorinated hydrocarbon mixture behaved as follows:

EXAMPLE III-A

A naphtha-chlorinated hydrocarbon mixture was prepared by adding 184 grams of solvent naphtha to 184 grams of 1,1,1-trichloroethane. This mixed solvent was added to 32 grams of fine particle size silica and stirred by hand until the silica was thoroughly wetted. It then was violently agitated for five minutes. The suspension was very thick and thixotropic before and after aging. Agitation caused the suspension to become fluid but it thickened with great rapidity. It was not an acceptable aerosol concentrate.

EXAMPLE IV

A solvent composed of 75 grams of isopropyl alcohol, 150 grams of 1,1,1-trichloroethane and 150 grams of solvent naphtha was added to 75 grams of fine particle size silica. The mixture was stirred and blended as is described above and 90 grams of the resultant suspension was placed in an aerosol container and to this was added 30 grams of dichlorodifluoromethane. The container was capped, fitted with an aerosol valve and an activator button and then was stored for four months during which time it was examined at intervals. The aerosol sprayed regularly without shaking. Examination showed that the material was somewhat thixotropic but became highly fluid with the slightest agitation and thickened quite slowly when allowed to stand undisturbed. The aerosol valve and button did not clog even when operated intermittently.

When alcohol was not present in aerosol formulations, only very low concentrations of silica produced operable bombs as shown in the following test formulations in Examples IV-A to IV-C:

EXAMPLE IV-A 184 grams of solvent naphtha and 184 grams of 1,1,1-trichloroethane were added to 32 grams of fine particle size silica. The slurry was stirred by hand until the silica was completely wetted and then blended by being shaken violently for 5 minutes. 104 grams of the above suspension was placed in an aerosol container and to this was added 56 grams of dichlorodifluoromethane. The aerosol container was capped, and was fitted with an aerosol valve and an activator button. The aerosol was stored for a period of four months and examined at intervals. The aerosol sprayed satisfactorily and no clogging of the aerosol valve or the activator button occurred.

EXAMPLE IV-B

The proportion of fine particle size silica was raised from 5.2 percent to 7.8 percent by weight as follows: 176 grams of 1,1,1,-trichloroethane was blended with 176 grams of solvent naphtha. This mixture of solvents was added to 48 grams of fine particle size silica. The mixture was stirred until the silica was wetted and then blended by agitation for five minutes. 78 grams of the above suspension was placed in an aerosol container and to this, 42 grams of dichlorodifluoromethane was added. The container was capped and fitted with an aerosol valve and activator button as before. At all times the silica suspension in the container was stable, thixotropic, and had high viscosity. The suspension thinned when it was shaken but thickened almost instantly to a non-flowable state if allowed to stand undisturbed. The aerosol sprayed satisfactory as long as the inlet of the dip tube remained flooded, but this condition could only be brought about by the constant shaking of the container. This formulation does not function as a satisfactory aerosol.

EXAMPLE IV-C

The silica content of this type of aerosol was increased still further to 9.0 percent of fine particle size silica by placing 90 grams of the silica-chloroethane-naphtha suspension of Example IV-B in an aerosol container and then adding 30 grams of dichlorodifluoromethane. The container was capped, fitted with an aerosol valve and activator button as before and stored for four months, during which period it was examined periodically. The silica suspension in the aerosol bomb was stable, thixotropic and very thick. The suspension thinned when shaken and thickened to an essentially non-flow state almost instantly when allowed to stand undisturbed. The aerosol sprayed satisfactorily as long as the inlet of the dip tube remained flooded, but this condition could not be maintained unless the bomb was constantly shaken. This formulation cannot be considered a satisfactory aerosol spray.

EXAMPLE V

A suspension medium consisting of 35.6 grams of isopropyl alcohol, 107.2 grams of 1,1,1-trichloroethane and 107.2 grams of solvent naphtha was added to 50 grams of fine particle size silica. This mixture was stirred and blended as before and 75.6 grams of the suspension was placed in an aerosol container, to which was added 59.4 grams of trichloromonofluoromethane and 45 grams of dichlorodifluoromethane. The container was sealed with an aerosol valve and fitted with a valve actuator.

The insecticidal properties of the material were determined as follows: Weighed pieces of paper measuring 4 x 5 inches were sprayed with aerosol to give a uniform residual deposit. After spraying, the papers were dried for five minutes under an infrared lamp and then weighed. The weight of the deposit was maintained at 100±10 milligrams. The weighed papers were then placed in aluminum flat bottom, 4 x 5 inch pans. The top edges of the pans were greased with a thin coat of petroleum jelly. Comparison samples were prepared by placing 4 x 5 inch papers in identical pans. These papers were dusted with 30 milligrams of fine particle size silica per pan.

Six (6) adult male German roaches were placed in one of the aerosol sprayed pans and the same number and type of roaches were placed in one of the dusted pans. The test was repeated each day for 10 days using new paper inserts each day. The roaches were examined every fifteen minutes to determine the time required to kill.

|  | Average 50% kill time, hrs. | Average 100% kill time, hrs. |
|---|---|---|
| Aerosol treated paper | 2.45 | 3.98 |
| Fine particle size silica | 2.83 | 3.58 |

EXAMPLE VI-a TO VI-jj

These examples illustrate the wide variety of alcohols and ketones that can be used as stabilizing agents in the aerosol concentrates and aerosol compositions of this invention. In each example an aerosol concentrate containing about 15 percent by weight of finely divided silica, 14 percent by weight of solvent naphtha, varying amounts of stabilizing agent as shown in the table which follows, and sufficient amounts of 1,1,1-trichloroethane to provide 71 percent by weight in the concentrate of the combined stabilizing agent and trichloroethane, was prepared as described in Examples I through V above, and its shelf stability for 30 days determined. Thereafter, there was added to each concentrate a mixture containing about 46.8 percent by weight of dichlorodifluoromethane and about 53.2 percent by weight of trichloromonofluoromethane in an amount of about 1.15 parts of said mixture per each part of the respective concentrate. The aerosol compositions thus prepared were placed in an aerosol container and the flame projection and the shelf stability of each was determined. Results are summarized in the following Table I.

Table I

| Example | Stabilizing Agent | Weight Percent of Agent | | Shelf Stability—30 days | | Aerosol Flame Projection, Inches |
|---|---|---|---|---|---|---|
| | | In Concentrate | In Aerosol | Concentrate | Aerosol | |
| VI-a | Methanol | 5.4 | 2.5 | Too Thick | | |
| b | do | 7.4 | 3.4 | OK | OK | 23 |
| c | do | 8.4 | 3.9 | OK | OK | 25 |
| d | do | 9.4 | 4.1 | OK | OK | 24 |
| e | do | 13.4 | 6.2 | OK | OK | 23 |
| f | do | 15.4 | 7.2 | OK | OK | 26 |
| g | do | 17.4 | 8.1 | OK | OK | 25 |
| h | Ethanol | 8.4 | 3.9 | OK | OK | 4 |
| i | do | 9.4 | 4.1 | OK | OK | 4 |
| j | do | 10.4 | 4.8 | OK | OK | 4 |
| k | do | 12.4 | 5.8 | OK | OK | 10 |
| l | do | 14.4 | 6.7 | OK | OK | 10 |
| m | Isopropanol | 8.4 | 3.9 | OK | OK | 2 |
| n | N-Butanol | 4.2 | 2.0 | OK | OK | 3 |
| o | do | 4.9 | 2.3 | OK | OK | 4 |
| p | do | 5.8 | 2.7 | OK | OK | 9 |
| q | do | 6.6 | 3.1 | OK | OK | 10 |
| r | do | 7.4 | 3.4 | OK | OK | 10 |
| s | do | 14.4 | 6.7 | Too Thin | | 15 |
| t | Sec-Butanol | 7.4 | 3.4 | OK | OK | 9 |
| u | do | 8.4 | 3.9 | OK | OK | 10 |
| v | do | 9.4 | 4.1 | OK | OK | 10 |
| w | do | 10.4 | 4.8 | OK | OK | 10 |
| x | do | 12.4 | 5.8 | OK | OK | 12 |
| y | 2-Octanol | 7.4 | 3.4 | OK | OK | 10 |
| z | do | 8.4 | 3.9 | OK | OK | 12 |
| aa | do | 10.4 | 4.8 | OK | OK | 12 |
| bb | do | 12.4 | 5.8 | OK | OK | 14 |
| cc | do | 14.4 | 6.7 | OK | OK | 20 |
| dd | Acetone | 10.4 | 4.8 | Too Thick | | |
| ee | do | 11.1 | 5.1 | do | | |
| ff | do | 12.4 | 5.8 | do | | |
| gg | do | 16.4 | 7.6 | OK | OK | 8 |
| hh | do | 18.4 | 8.6 | OK | OK | 10 |
| ii | do | 20.4 | 9.5 | OK | OK | 10 |
| jj | do | 22.4 | 10.4 | OK | OK | 10 |

EXAMPLE VII

This example illustrates the wide variety of aerosol compositions which are suitably prepared in accordance with this invention using isopropanol as the suspension stabilizing agent. Also illustrated is the suitable range for isopropanol to silica ratio. All aerosol compositions were prepared in the same manner as described in the preceding examples. Data is presented in Table II below.

EXAMPLES VIII-a to VIII-h

This example illustrates the efficacy of adding a knockdown agent to the insecticidal aerosol compositions of this invention. Preparation of the test pans was the same as that described in Example V with the exception that the loading of the dusted pans (rather than sprayed pans) was varied between about 30 and 50 milligrams as shown in Table III below. Compositions of the aerosols was as follows:

| Ingredient | Without Knockdown Agent, percent by weight | With Knockdown Agent, percent by weight |
|---|---|---|
| Silica | 7.0 | 7.0 |
| Isopropanol | 3.9 | 3.9 |
| Solvent naphtha | 6.5 | 5.1 |
| 1,1,1-trichloroethane | 29.1 | 29.1 |
| 20% pyrethrum extract | | 1.0 |
| Piperonyl butoxide | | 0.4 |
| Trichloromonofluoromethane | 28.5 | 25.0 |
| Dichlorodifluoromethane | 25.0 | 25.0 |

In one series of tests, four adult American roaches were placed in (1) a dusted pan, (2) a pan sprayed with aerosol without knockdown agent and (3) a pan sprayed with aerosol containing knockdown agent, and the time required for 50 percent and 100 percent kill of the roaches determined. In another test series, the results were determined using four male adult Oriental roaches in each pan. Results are summarized in Table III.

Table II

| Aerosol Composition, Percent by Weight | | | | | | Wt. Ratio of Isopropanol to Silica | Aerosol Shelf Stability 4 mos. at Room Temperature |
|---|---|---|---|---|---|---|---|
| Silica | Isopropanol | 1,1,1-Trichloroethane | Solvent Naphtha | Propellant | | | |
| | | | | A [1] | B [2] | | |
| 7.0 | 3.0 | 16.0 | 16.0 | 33 | 25 | .43 | Good. |
| 7.0 | 5.0 | 15.0 | 15.0 | 33 | 25 | .71 | Do. |
| 7.0 | 7.0 | 14.0 | 14.0 | 33 | 25 | 1.0 | Do. |
| 7.0 | 8.3 | 13.3 | 13.3 | 33 | 25 | 1.2 | Do. |
| 7.0 | 10.0 | 12.5 | 12.5 | 33 | 25 | 1.43 | Silica sets hard in 6 days—not easily redispersible. |
| 7.0 | 11.7 | 11.6 | 11.6 | 33 | 25 | 1.67 | |
| 10.8 | 4.6 | 24.8 | 24.8 | | 35 | .42 | Thin but OK. |
| 10.8 | 7.7 | 23.2 | 23.2 | | 35 | .71 | Good. |
| 10.8 | 10.8 | 21.7 | 21.7 | | 35 | 1.0 | Do. |
| 10.8 | 13.0 | 20.6 | 20.6 | | 35 | 1.2 | Do. |
| 10.8 | 15.6 | 19.3 | 19.3 | | 35 | 1.45 | Silica sets hard in 6 days—not easily redispersible. |
| 10.8 | 18.2 | 18.0 | 18.0 | | 35 | 1.68 | |
| 5.2 | | 29.9 | 29.9 | | 35 | | Good. |
| 7.8 | | 28.6 | 28.6 | | 35 | | Silica sets hard—not readily dispersible. |

[1] Freon 11—Trichloromonofluoromethane.
[2] Freon 12—Dichlorodifluoromethane.

Table III

| Example | Relative Humidity, Percent | Insect | Dusted Pan | | | Aerosol Without Knockdown Agent | | Aerosol With Knockdown Agent | |
|---|---|---|---|---|---|---|---|---|---|
| | | | Loading (milligrams of silica) | 50% Kill (hours) | 100% Kill (hours) | 50% Kill (hours) | 100% Kill (hours) | 50% Kill (hours) | 100% Kill (hours) |
| VIII-a | 57 | American Roaches | 30 | >12 | 47 | 12 | 47 | 4.25 | 4.5 |
| VIII-b | 49 | do | 30 | >30 | 48 | >7 | 24 | 6.75 | <24 |
| VIII-c | 49 | do | 50 | >32 | 47 | >32 | 50 | 5.75 | <24 |
| VIII-d | 53 | do | 50 | >7 | 47 | 28 | 47 | 4.75 | <23 |
| VIII-e | 43 | do | 50 | 24 | 28 | 31 | <46 | 6.0 | <22 |
| VIII-f | 53 | do | 50 | 28 | 30 | 29 | 32 | 4.25 | <23 |
| VIII-g | 57 | Oriental Roaches | 30 | 13 | >13 | 5 | 13 | 2.75 | 4.25 |
| VIII-h | 49 | do | 30 | >7 | >22 | 4.5 | 6.75 | 4.5 | 5.75 |

Aerosol bombs containing the aerosol compositions described hereinabove have adequate, dependable commercial life. Despite the solid phase insecticidal, the bombs discharge dependably in household use and have the great advantage that they can be safely used in areas where soluble insecticidal materials toxic to humans would be intolerable.

What is claimed is:

1. An arosol concentrate suitable for preparing aerosol compositions which comprises a suspension medium selected from the group consisting of 1,1,1-trichloroethane, solvent naphtha and mixtures thereof; an effective amount of a low molecular weight suspension stabilization agent selected from the group consisting of alcohols and ketones, said alcohols and ketones containing no more than 10 carbon atoms and from about 10 to about 20 percent by weight, based on the weight of the total concentrate, of finely divided silica.

2. Concentrate as defined in claim 1 wherein the solvent is naphtha is a narrow boiling range petroleum hydrocarbon fraction having a boiling range between about 140° centigrade and about 400° centigrade.

3. Concentrate as defined in claim 1 wherein the amount of suspension stabilization agent is from about 0.25 to about 1.5 parts by weight per part by weight of said silica.

4. Concentrate as defined in claim 1 wherein said finely divided silica has an average particle size of less than about 5 microns.

5. An insecticidal aerosol composition comprising the aerosol concentrate of claim 1 and from about 0.5 to about 1.5 parts by weight of a propellant per part by weight of said concentrate.

6. An aerosol bomb containing the insecticidal composition of claim 5.

7. Aerosol concentrate suitable for use in preparing aerosol compositions which comprises from about 10 to about 20 percent by weight, based on the total weight of said concentrate, of a finely divided silica having an average particle size of less than about 5 microns; a suspending medium for said silica containing a mixture of 1,1,1-trichloroethane and solvent naphtha in a weight ratio of from about 3 to 1 to about 15 to 1 of the respective ingredients, and from about 0.25 to about 1.5 parts by weight per part by weight of said silica of a low molecular weight suspension stabilizing agent selected from the group consisting of alcohols and ketones, said alcohols and ketones containing no more than 10 carbon atoms.

8. An aerosol concentrate suitable for use in preparing aerosol compositions which comprises a suspension medium selected from the group consisting of 1,1,1-trichloroethane, solvent naphtha and mixtures thereof, an effective amount of an alcohol suspension stabilization agent, said alcohol containing no more than 10 carbon atoms and from about 10 to about 20 percent by weight, based on the weight of the total concentrate, of finely divided silica.

9. Concentrate as defined in claim 8 wherein the said stabilizing agent is methanol in an amount of from about 0.5 to about 1.2 parts by weight per part by weight of silica.

10. Concentrate as defined in claim 8 wherein the said stabilizing agent is ethanol in an amount of from about 0.5 to about 1.0 part by weight per part by weight of silica.

11. Concentrate as defined in claim 8 wherein the said stabilizing agent is n-butanol in an amount of from about 0.25 to about 0.75 part by weight per part by weight of silica.

12. Concentrate as defined in claim 8 wherein the said stabilizing agent is sec-butanol in an amount of from about 0.5 to about 1.0 part by weight per part by weight of silica.

13. Concentrate as defined in claim 8 wherein the said stabilizing agent is 2-octanol in an amount of from about .5 to about 1.0 part by weight per part by weight of silica.

14. Concentrate as defined in claim 8 wherein the said stabilizing agent is isopropanol in an amount of from about 0.4 to about 1.2 parts by weight per part by weight of silica.

15. An insecticidal aerosol composition comprising the aerosol concentrate of claim 14 and from about 0.5 to about 1.5 parts by weight of a propellant per part by weight of said concentrate.

16. An insecticidal aerosol as defined in claim 15 wherein the propellant is selected from the group consisting of trichloromonofluoromethane, dichlorodifluoromethane and mixtures thereof.

17. An aerosol bomb containing the insecticidal composition of claim 16.

18. An insecticidal aerosol as defined in claim 16 wherein the said composition also contains from about 0.05 to about 0.25 percent by weight of pyrethrins and from about 0.1 to about 1.0 percent by weight of piperonyl butoxide based on the total weight of the composition.

19. An aerosol bomb containing the insecticidal composition of claim 18.

20. An insecticidal aerosol composition comprising the aerosol concentrate of claim 8 and from about 0.5 to about 1.5 parts by weight of a propellant per part by weight of said concentrate.

21. An aerosol bomb containing the insecticidal composition of claim 20.

22. An aerosol concentrate suitable for use in preparing aerosol compositions which comprises a suspension medium selected from the group consisting of 1,1,1-trichloroethane, solvent naphtha and mixtures thereof, an effective amount of a ketone suspension stabilization agent, said ketone containing no more than 10 carbon atoms and from about 10 to about 20 percent by weight, based on the weight of the total concentrate, of finely divided silica.

23. Concentrate as defined in claim 22 wherein the said stabilizing agent is acetone in an amount of from about 1.0 to about 1.5 parts by weight per part by weight of silica.

24. An insecticidal aerosol composition comprising the aerosol concentrate of claim 22 and from about 0.5 to about 1.5 parts by weight of a propellant per part by weight of said concentrate.

25. An aerosol bomb containing the insecticidal composition of claim 24.

26. Aerosol concentrate suitable for use in preparing aerosol compositions which comprises from about 10 to about 20 percent by weight, based on the total weight of said concentrate, of a finely divided silica having an average particle size of less than about 5 microns, a suspended medium for said silica containing a mixture of 1,1,1-trichloroethane and solvent naphtha in a weight ratio of from about 3 to 1 to about 15 to 1 of the respective ingredients, and from about 0.25 to about 1.5 parts by weight per part by weight of said silica of an alcohol suspension stabilizing agent, said alcohol containing no more than 10 carbon atoms.

27. Aerosol concentrate suitable for use in preparing aerosol compositions which comprises from about 10 to about 20 percent by weight, based on the total weight of said concentrate, of a finely divided silica having an average particle size of less than about 5 microns, a suspended medium for said silica containing a mixture of 1,1,1-trichloroethane and solvent naphtha in a weight ratio of from about 3 to 1 to about 15 to 1 of the respective ingredients, and from about 0.25 to about 1.5 parts by weight per part by weight of said silica of a ketone suspension stabilizing agent, said ketone containing no more than 10 carbon atoms.

References Cited in the file of this patent

UNITED STATES PATENTS

| | | |
|---|---|---|
| 2,358,986 | McGovran et al. | Sept. 26, 1944 |
| 2,959,325 | Beard | Nov. 8, 1960 |
| 2,980,582 | Keats | Apr. 18, 1961 |
| 3,014,844 | Thiel et al. | Dec. 26, 1961 |

FOREIGN PATENTS 837,465    Great Britain _____ June 15, 1960

OTHER REFERENCES

Powder Aerosols, Soap and Chem. Specialities, January 1955, pages 139, 141 and 169.

DiGiacomo: Drughand Cosmetic Industry, September 1956, 79, 3 pages, 382–329.

Ebeling et al.: Journal of Economic Entomology, vol. 52, No. 2, pp. 190–207, April 1959.